METHODS AND APPARATUS FOR BENDING WAVE GUIDE TUBING

Original Filed Dec. 18, 1951 3 Sheets-Sheet 1

INVENTOR

Francis J. Fuchs, Jr.

BY H. J. Winegar

ATTORNEY

METHODS AND APPARATUS FOR BENDING WAVE GUIDE TUBING

Original Filed Dec. 18, 1951 3 Sheets-Sheet 2

INVENTOR

Francis J. Fuchs, Jr.

BY H. J. Winegar

ATTORNEY

METHODS AND APPARATUS FOR BENDING WAVE GUIDE TUBING

Original Filed Dec. 18, 1951 3 Sheets-Sheet 3

INVENTOR

Francis J. Fuchs, Jr.

BY H. J. Winegar

ATTORNEY

United States Patent Office

Re. 24,646
Reissued May 12, 1959

24,646

METHODS AND APPARATUS FOR BENDING WAVE GUIDE TUBING

Francis J. Fuchs, Jr., Winston-Salem, N.C., assignor to Western Electric Company, Incorporated, New York, N.Y., a corporation of New York Original No. 2,792,048, dated May 14, 1957, Serial No. 262,247, December 18, 1951. Application for reissue September 26, 1958, Serial No. 763,768

7 Claims. (Cl. 153—40)

Matter enclosed in heavy brackets [ ] appears in the original patent but forms no part of this reissue specification; matter printed in italics indicates the additions made by reissue.

This invention pertains to the bending of materials, and more particularly to methods and apparatus for bending wave guide tubing.

In the bending of wave guide tubing it is essential that the internal dimensions of the finished wave guides be uniform throughout and that the surfaces be smooth.

It is an object of the present invention to avoid the formation of folds and wrinkles upon the internal and external surfaces of the tubing during the bending operation.

Another object of the invention is to provide a tube bending machine having improved wiping and forming dies to control and guide the flow of metal during the bending operation to restrict the distortion thereof to the amount and direction desired to maintain the internal dimensions of the tube.

Another object is to eliminate friction between the wiper die and the tubing being bent by the use of a thin flexible metal strip therebetween.

Another object is to provide a simplified booster means for pushing the tube ahead at a predetermined rate as it is bent.

Still another object is the provision of an improved means for automatically clamping the tube during the bending operation.

In order to attain these and other objectives, and in accordance with the general features of the invention, one embodiment thereof includes a rotatable forming die having a calculated offset or indentation for controlling the flow of metal in the tube being bent, an automatic releasing clamping die for securely holding one end of the tube against the forming die during the entire bending operation, a pressure die for restraining the free end of the tube from moving out of the straight line in which it originally lay and cause it to move along its longitudinal axis, a mandrel with means for inserting it in the tube at a point where bending begins, a wiper die of critical contour which is calculated from an equation or formula derived from new methods and discoveries, and a thin spring steel strip interposed between the wiper die and the tube being bent.

Other novel features and advantages of the present invention will become apparent in the following description, reference being had to the accompanying drawings, wherein Fig. 1 is a plan view of a bending machine embodying the features of the invention;

In the drawings and throughout the specification, like reference numerals are employed to designate similar parts.

Figures 1, 2:
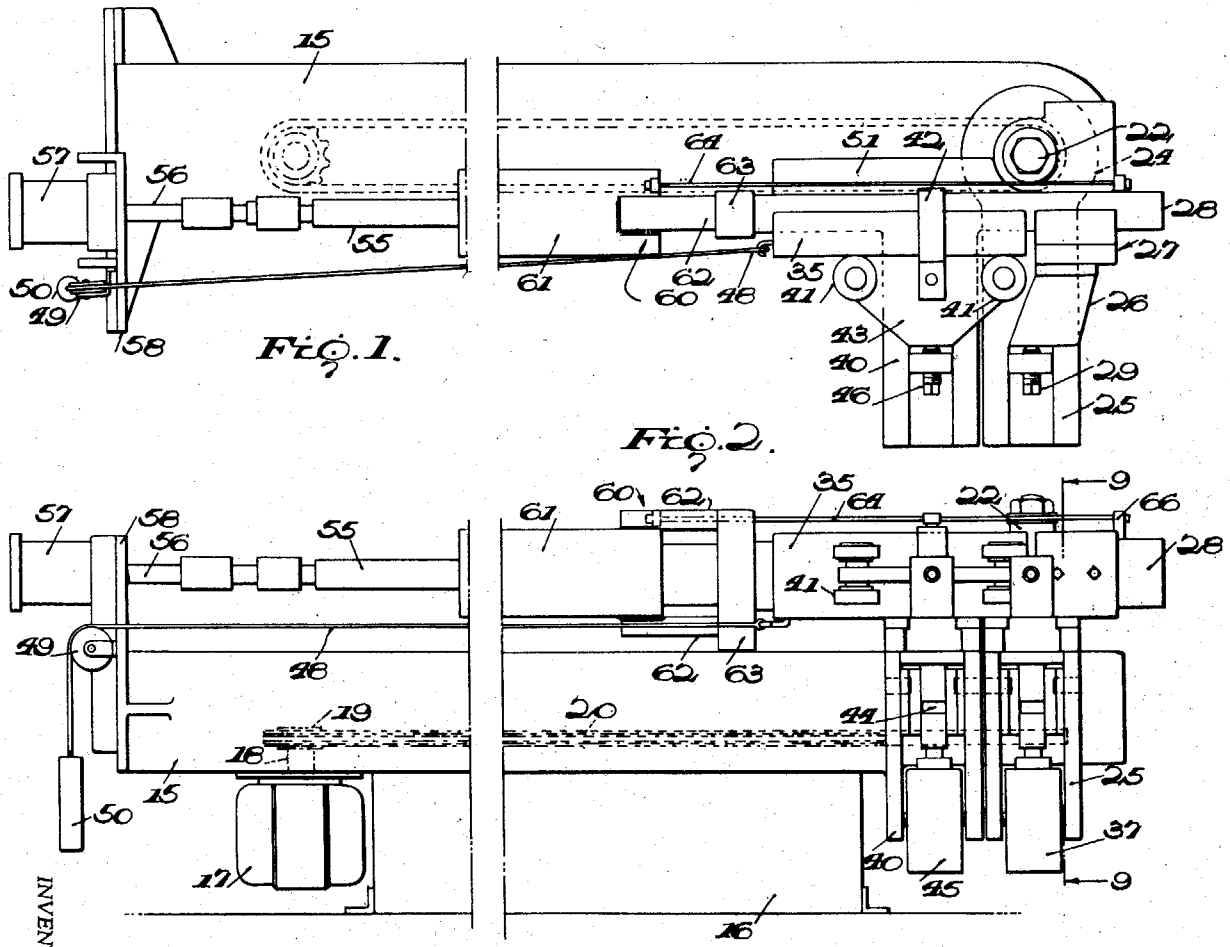
Fig. 2 is a front elevational view of the machine shown in Fig. 1.
Figures 7, 8, 9, 10, 11:
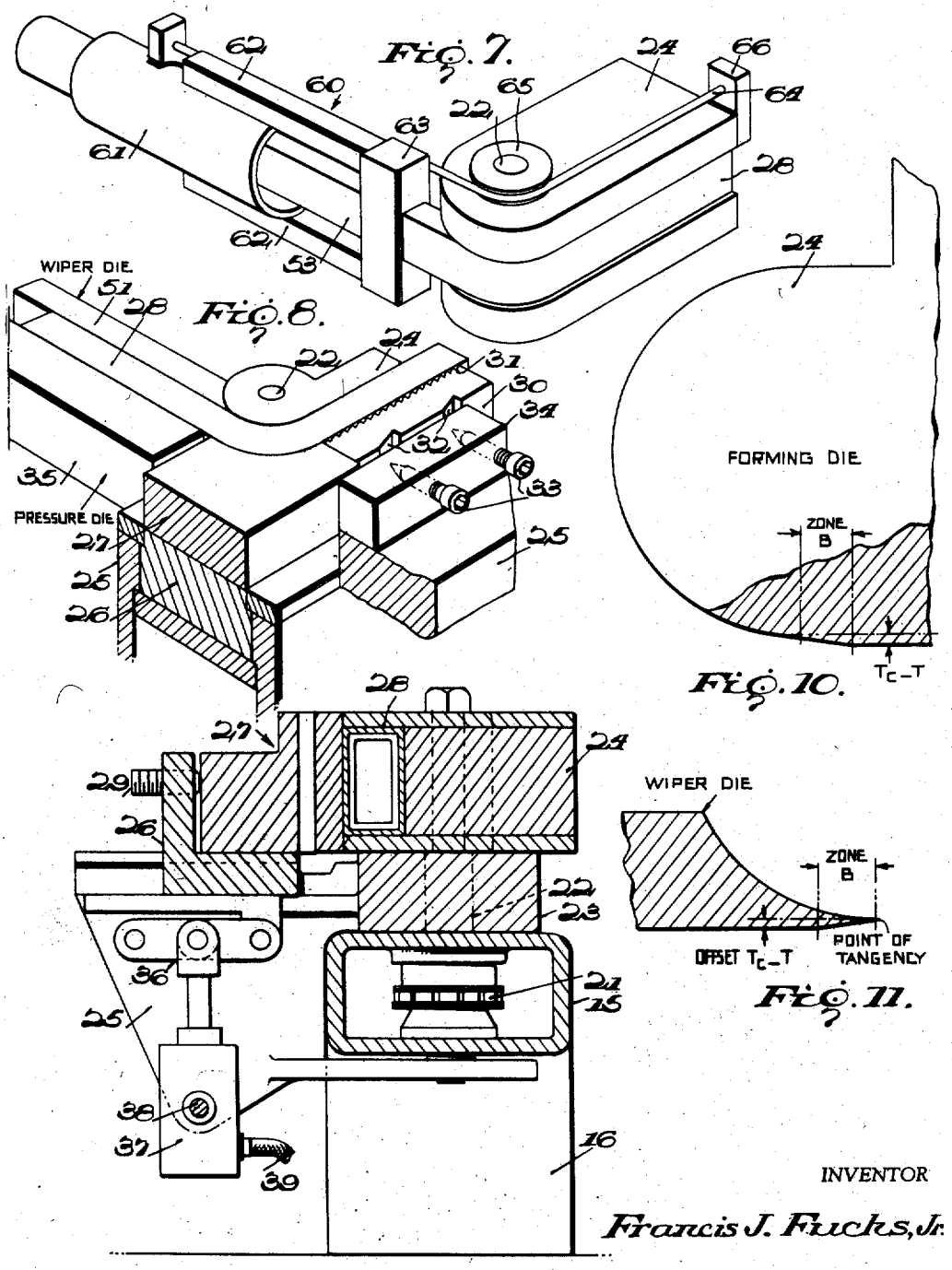
Fig. 7 is an enlarged perspective view of a portion of Fig. 1 showing the booster mechanism as controlled by the movement of the forming die for engaging the rear end of the wave guide tubing to force it forward in making a 90° bend.
Fig. 8 is an enlarged perspective diagrammatic view of a portion of the structure of Fig. 1 disclosing the automatic clamping and releasing die for rigidly securing the tubing to the forming die in making a compound bend.
Fig. 9 is an enlarged sectional view taken along line 9—9 of Fig. 2 and shows the carriage for mounting the clamping die, which carriage is actuated by a hydraulically operated toggle joint, and also shows the sprocket and chain drive for operating the vertical shaft to which the forming die is attached.
Fig. 10 is an enlarged fragmentary view of the forming die disclosing the critical contour derived by formula.
Fig. 11 is an enlarged fragmentary longitudinal section of the wiper die showing the critical contour derived by formula.

Referring now to the drawings, the numeral 15 designates a frame which is supported a predetermined distance from the floor by a base 16 (Figs. 1, 2 and 9). Depending from and secured to the under side of one end of this frame is a reversible electric motor 17 for driving a shaft 18 through a suitable clutching mechanism (not shown), sprocket 19, and an endless chain 20 which actuates another sprocket 21 splined to a vertical shaft 22 rotatable in suitable bearings in the other end of the frame 15.

A forming die supporting head 23 is fastened to the upper portion of the driven shaft 22 and carries a forming die 24 for bending bodies, such as radar wave guide tubing. The forming die is preferably made of a plurality of keyed together parts so that the upper one can be quickly displaced to permit easy removal of the tubing after it is bent. Integral with the head 23 is an arm 25 for slidably supporting a carriage 26 which carries a clamping die 27 for clamping a piece of wave guide tubing 28 to the forming die 24. The clamping die is adjustable with respect to the carriage by means of an adjustment screw 29 provided for that purpose.

AUTOMATIC CLAMPING DIE

A preferred form of a clamping die for making compound bends which are close together is shown in Fig. 8 and consists of a clamping block 30 having a serrated surface 31 for engaging and gripping the wave guide tube 28 to clamp it rigidly against the forming die 24. The face of the block 30 opposite this serrated gripping surface is provided with two spaced sloping indentations or tapers 32 which are adapted to engage with the conical ends of a pair of adjustable screws 33 threaded into an upright stud 34 secured to the arm 25. Here the forward end of the clamping die 27 is contoured to conform to the bent tubing 28 and slidably mounted on the carriage 26 to engage the left end of the clamping block 30. When a compound second bend is to be made near a bend previously made, the bent tube 28 is clamped as indicated in Fig. 8. At the start of the bending operation, the clamping die 27 mounted on carriage 26 moves forward and pushes the clamping block 30 forward to cause the tapers 32 to wedge against the conical pointed adjusting screws 33 to press the clamping block tightly against the tube 28. After completion of this second bending operation, the clamping die 27 moves back on its carriage 26 to its normal position, thereby causing the clamping block 30 to move back (Fig. 8) into released position due to the pressure of the screws 33 on the inclines or tapers 32.

The carriage 26 with its clamping die 27 (Figs. 2 and 9) is quickly moved into operative clamping position by a toggle joint 36 actuated by a pressure operated cylinder 37 which is pivoted at 38 to the arm 25 and is connected by a flexible hose 39 to a suitable fluid under pressure, such as liquid or air.

The reciprocable pressure bar or die 35 restrains the unclamped end of tube 28 from rotating or moving out of its original straight line and cooperates with the forming die during the bending operation. This pressure die is slidably mounted on an arm 40 integral with the frame 15 and extending crosswise therefrom. In order to reduce frictional drag, the reciprocable pressure die 35 moves with the tubing 28 as it is bent and is supported by pairs of rollers 41 (Fig. 1) and a right angle metal guide strap 42 mounted on a carriage 43 which is slidable on the arm 40. The carriage 43 with its adjusting screw 46 and the adjustable pressure die 35 is actuated into engagement with the tube 28 by a toggle joint 44 and a pressure cylinder 45 which are similar in construction to the toggle joint 36 and cylinder 37 previously described for actuating the clamping die carriage 26. The pressure die 35 is normally retracted by a cable 48 passing over a pulley 49 attached to the end of the frame 15 and by a weight 50 secured to the end of the cable.

Figure 3:
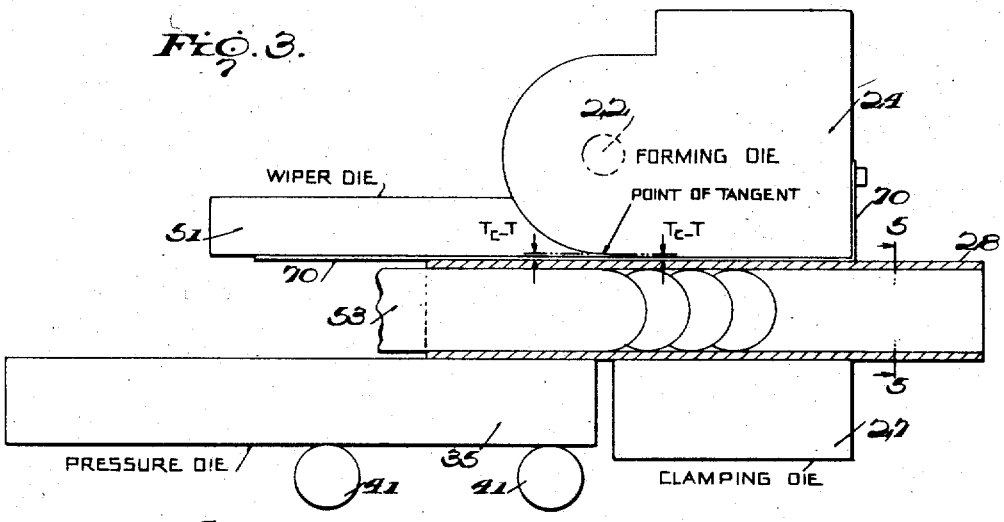
Fig. 3 is a schematic plan view showing the relative positions of the rotatable forming die with its thin spring steel strip, the stationary wiper die, the clamping die, the movable pressure die, and the mandrel inserted in a hollow wave guide tubing to be bent.

Opposite the clamping die 27 and the pressure die 35 on one side of the tubing 28 are the forming die 24 and a wiping die 51 on the other side of the tubing, all of which cooperate in the bending operation. The wiping die 51 is adjustably secured to the frame 15 adjacent the forming die. In order to eliminate friction between the tubing 28 and the wiping die 51 a thin spring steel strip 70 is attached to the forming die 24 and is interposed between the wiping die and the tubing as shown in Fig. 3. This steel strip is thin and flexible enough to conform to the exact contours of the wiping and forming dies during a bending operation.

Figure 4:
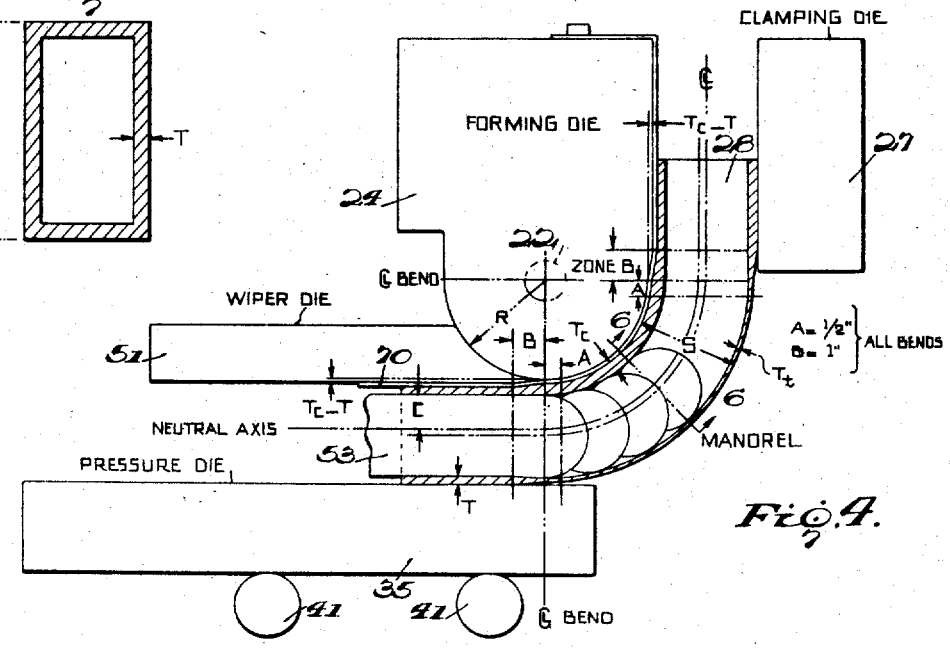
Fig. 4 is a plan view of the apparatus of Fig. 3 showing the relative position of the tooling parts and the distortion or flow of the metal of the hollow wave guide tubing after being bent through an angle of 90°.

A mandrel 53 is necessary in bending hollow bodies and hence such a mandrel is inserted in the tube 28 at the place of bend as shown in Figs. 3 and 4. The mandrel is secured to and supported by an actuating rod 55 (Figs. 1 and 2) which is connected to a piston 56 of a cylinder 57 operated by suitable fluid under pressure. This cylinder for moving the mandrel 53 into and out of the tubing 28 is rigidly secured to an upright flange 58 integral with the frame 15.

BOOSTER MECHANISM

In order to alleviate the drag of the mandrel and the pulling strain of the clamping die 27 on the tubing 28 during its bending, a booster mechanism 60 (Fig. 7), slidably supported on the frame 15, is provided for pushing the tubing 28 toward the forming die. This booster comprises a tubular sleeve 61 slidably supported on the mandrel rod 55, bars 62 welded to the upper and lower parts of the sleeve, an apertured head 63 engaged by the bars 62 and slidably mounted on the top of the frame 15 for engaging the rear end of the piece of tubing 28 to be bent. Secured to the sleeve 61 is one end of a cable 64 which passes over a pulley 65 rotatably mounted on the drive shaft 22 and placed on top of the forming die 24; the other end of this cable 64 being secured to an upright stud 66 welded to the rotatable forming die 24. Various diameter pulleys 65 can be used to provide a more positive acting booster in that the diameter of this pulley controls the position of the neutral axis of the tube being bent. When the forming die 24 is rotated to bend the tube 28, the cable 64 pulls the sleeve 61, the bars 62 and the head 63 forward to apply pressure against the rear end of the tube.

CRITICAL CONTOURS OF THE WIPING AND FORMING DIES

The apparatus disclosed in the drawings is designed to use the principle of draw bending where the tube is bent by being drawn over the mandrel 53 between the pressure die 35 and the wiper die 51 and about the rotatable forming die 24. These tools, in combination, may be considered as a drawing die for controlling the flowing metal of the tube both inside and out for distances of distortion designated zone A and zone B (Fig. 4).

Figure 6:
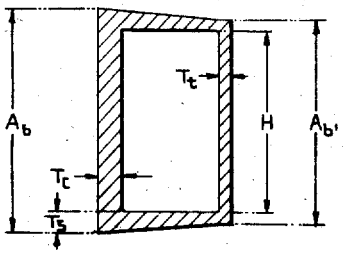
Fig. 6 is an enlarged cross section of the wave guide tubing taken along line 6—6 of Fig. 4 disclosing the displacement of the metal of the tubing after being bent through an angle of 90° on the machine disclosed.

As is the case in the bending of any rod or tubing, the metal of the bent wave guide 28 is thrown partly into compression and partly into tension about a dividing line called the "neutral axis." The portion of the tube under tension must stretch to produce a thin wall and the portion under compression must shorten in length to produce a thick wall as shown in Figs. 4 and 6; this displacement of the metal occurs not only on the curved part of the tube 28 but also along the straight portion thereof for a predetermined distance beyond the tangent point at both ends of the bend. This distance is shown in Fig. 4 as zone B. The distance beyond the tangent point into the curve where the full elongations and compression effects are not complete is designated zone A. The amount of distortion in zone A is less than the distortion in the center part of the bend by the amount of material distorted in zone B. In other words, the distortion in wall thickness due to bending stresses rises from a minimum at the beginning of zone B to a maximum at the end of zone A. These zones include the only portion of the tube under active stress or distortion at the time of bending. The straight portion of the tube to the [right] *left* (Fig. 4) of zone B has no bending stresses and the portion of the bend to the [left] *right* of zone A has already undergone maximum distortion and, therefore, it is in an inactive state. Hence, there exists a band or area of the tube on both sides of the tangent point where the metal of the tube is in a state of flow during the bending operation. This area covered by zones A and B is critical in view of the fact that tools or dies must be designed which will guide the flowing metal and restrict the distortion to the amount and direction desired to maintain the internal dimensions of the tube.

It is now discovered that the lengths of zones A and B do not vary appreciably with the size, radius of bend, or the material of the tube. By measurement, it was found that zone B averaged about one inch and zone A, about one-half inch in length.

The location of the neutral axis of the tube 28 varies somewhat according to the particular tooling employed, the amount of annealing of the tube, and the type of booster used. If the tooling drags considerably on the tube as it is being pulled through the bending dies, the neutral axis will be lowered. If a booster (Fig. 7) is used to push the tube into the dies, then the neutral axis will be raised. The ideal condition is to boost the tube sufficiently to keep the neutral axis coincident with the center line (℄) of the tubing, thus giving an equal amount of tension and compression. However, it is found that the neutral axis is located about $\frac{4}{10}$ of the distance S (Fig. 4) for the tooling disclosed.

Figure 5:
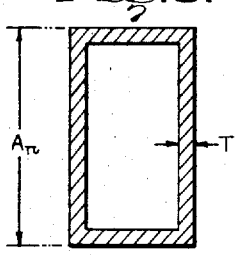
Fig. 5 is an enlarged cross section of the wave guide tubing taken along line 5—5 of Fig. 3 showing the normal position of the metal of the wave guide before being subjected to bending stresses.

To determine the critical contour of the tools or dies, the amount of distortion or displacement of the metal must be predictable. The quantities desired are the thickness of the compression thickened wall $T_c$ of a bent tube (Figs. 4 and 6), and $A_b$ shown in Fig. 6. Disregarding any increase in top and bottom wall thickness *and the thickness of a steel wearing strip 70,* the inner wall next to the forming die 24 should increase in direct proportion to its distance from the neutral axis. Assuming an angle of bend $\alpha$, the metal in compression in this wall of the tube would equal T (Fig. 5), which is the normal wall thickness, times $2\pi$ times the radius to the neutral axis (R+T+C, Fig. 4) times $\alpha$ times $A_n$ before bending. After bending, the volume would equal $T_c \times 2\pi \times$ the radius to the center line of the wall $$\left(R+\frac{T}{2}\right), \text{ times } \frac{\alpha}{360} \text{ times } A_n$$

Since the volume cannot change inasmuch as the bend has been completed, this volume =

$$T \times 2\pi \times (R+T+C) \times \frac{\alpha}{360}$$

which =

$$T_c \times 2\pi \times \left(R+\frac{T}{2}\right)\frac{\alpha}{360}$$

Solving this equation, $$T_c = T \times \left(\frac{R+T+C}{R+T/2}\right) \qquad \text{Equation I}$$

However, the top and bottom walls do distort and some of the other metal, which otherwise would contribute to $T_c$, is forced into the corners. Since the cross section must stay the same $T_c$ is smaller than indicated in Equation I by an amount proportional to $$\frac{A_n}{A_b}$$

Hence, $$T_c = \frac{A_n}{A_b} \times T\left(\frac{R+T+C}{R+T/2}\right) \qquad \text{Equation II}$$

$T_c$ and $A_b$ are both unknowns, and it is necessary to find another relationship, preferably for $A_b$. Figure 6 shows that the thickness of the top and bottom walls increases from normal at the neutral axis to a maximum at the inside corners and since there is very little or no vertical distortion in these walls and there is no tendency for the metal in the outside corners to expand, it is assumed that a normal thickening of the wall will occur proportional to its distance from the neutral axis. Thus the equation first derived for the tube wall adjacent the forming die also is true for the top and bottom walls at the corners. Hence, $$T_s = T\left(\frac{R+T+C}{R+T/2}\right)$$

and $$A_b = H+2T_s = H+2T\left(\frac{R+T+C}{R+T/2}\right) \qquad \text{Equation III}$$

where $T_s$ is the maximum thickness of the top and bottom walls of the tubing as shown in Fig. 6. Equations II and III hold true only if the tube distorts uniformly around the bend, stopping exactly at the tangent points, and only if sharp corners and flat sides are maintained. In practice it is found that non-uniformity due to the distortion beyond the tangent point and rounding of corners, etc. make it necessary to introduce a corrective factor. These non-uniformities vary with the size of tubing, radius of bend, and wall thickness. They vary directly with the size, directly with the thickness and indirectly with the radius.

Thus the following accurate equations are derived:

$$T_c = \frac{TA_n(R+T+C)}{A_b(R+T/2)} - K\frac{ST}{R} \qquad \text{Equation IV}$$

$$A_b = H+2T\left(\frac{R+T+C}{R+T/2}\right) - Q\frac{ST}{R} \qquad \text{Equation V}$$

where K and Q are constants empirically determined to be approximately .2 and .6, respectively. These values are determined by measuring $T_c$, C, and $A_b$ of bent tubes, and using nominal values for the others and then solving for K and Q where C was calculated to be $$\frac{T_c-T}{T_c-C} \times (S-2T)$$

The quantity $$\frac{ST}{R}$$

is a good index of how difficult a particular tube is to bend; the higher it is, the greater the difficulty involved. If $$\frac{ST}{R}$$

is kept below .050, very little trouble will be encountered.

The steel forming die 24 should have a thickness equal to $A_b$ as calculated from Equation III. The forming die has an arcuate forming surface of radius R and also has a straight portion for clamping the tube thereto. This straight clamping portion for a simple bend should have a length of approximately seventy-five times the thickness of the wall of the tubing being bent and should be offset or project beyond the tangent line of the arcuate forming surface by an amount equal to $T_c$—T (Figs. 3, 4 and 10) and taper back at the tangent point at the place of bend from zero thickness through a distance equal to zone B, or one inch, to its maximum thickness of $T_c$—T.

The contour of the wiper die is also very critical. Its shape within the zone of bending action is very important and will do more to provide a satisfactorily accurate bend than any other part of the tooling. A common trouble encountered in bending is the production of wrinkles at the inside wall of the bend. This condition is avoided by allowing the wiper die to be offset or project beyond the tangent by an amount equal to $T_c$—T and to be tapered through zone B down to zero at the point of tangent (see Figs. 3, 4, and 11). This contouring of both the wiper die and the forming die is critical in eliminating wrinkles and in maintaining the internal dimensions of the tube with smooth surfaces. This new method of contouring wiper and forming dies has a distinct advantage since the pressure die 35 now need be only "finger-tight," thus avoiding excess wear of the tools, the breakage of mandrels, and excessive distortion of the tubing.

OPERATION OF THE BENDING MACHINE

With the pressure die 35, the clamping die 27 and the mandrel 53 in retracted positions, the wave guide tubing 28 to be bent is started on the mandrel and placed against the forming die 24 and wiper die 51. The machine is then started, and fluid pressure is applied through the flexible hose 39 to the cylinder 37 (Fig. 9) to actuate the toggle joint 36 to move the carriage 26 and its clamping die 27 forward to rigidly clamp the tube 28 to the forming die 24 (Fig. 3). Fluid pressure is next applied to the cylinder 45 to operate the toggle 44 which moves the carriage 43 and the pressure die 35 forward so that the latter engages the tube 28 (Fig. 2). Thus the pressure die presses against the tube 28 and prevents its left end from moving outward during the bending operation.

The mandrel-operating piston 56 within the cylinder 57 is then actuated by applying fluid pressure to move the supporting rod 55 and its mandrel 53 to the right into the tube 28 (Figs. 1 and 2). The rigid right end of the mandrel stops at the center line or tangent point as indicated in Fig. 3.

The forming die 24, clamping die 27 and their associated supporting head 23 and arm 25 are rotated counterclockwise (Figs. 1, 2 and 4) by means of the shaft 22 which is driven through the sprocket 21 (Fig. 9), endless chain 20, sprocket 19, shaft 18 and a clutch mechanism from the reversible electric motor 17. As the forming die 24 rotates, the tubing 28 is drawn over the mandrel 53 and in wiping engagement with the contoured wiper die 51 and thence about the forming die. The pressure die 35 moves along on its rollers 41 and restrains the left end of the tube 28 to move longitudinally of its axis in a straight line as the tube is bent. Also, the booster 60 (Fig. 7) is moved by its cable 64 attached to the rotary forming die 24 to engage the left end of the tubing 28 to boost the movement thereof toward the forming die and thus relieve the pulling force exerted on the clamped right end of the tubing and at the same time control the position of the neutral axis of the tubing being bent.

Upon completion of the bending operation, the mandrel 53 is withdrawn from the bent tube 28 by the fluid pressure operated cylinder 57. The toggles 36 and 44 are then moved to open position by operation of their cylinders 37 and 45 to open the clamping die 27 and retract the pressure die 35 away from the bent tube which is then removed from the machine by the operator.

During bending, the cross section of the tube 28 within the zones A and B gradually changes from the section "before bending" (Fig. 5) to the section "after bending" (Fig. 6) as controlled by the offset tapered contour $T_c-T$ on the forming and wiper dies (Figs. 10 and 11). In the present invention the mandrel 53 is merely used to prevent collapse of the tube and has no particular correlation with the tapered offsets $T_c-T$. It has been common practice heretofore to allow the metal in the inner wall of the tubing adjacent the forming die to swell up against the mandrel and then attempt to overcome this difficulty by applying excessive pressure which ruins the smooth blending of the curve and deleteriously modifies the internal dimensions of the bent tube. The critical offset portions $T_c-T$ on both the forming and wiper dies of the present invention allows the swelling metal to flow outward while guiding and controlling its flow to restrict the distortion thereof to the amount and direction desired to produce a smooth curved surface and maintain the original internal dimensions of the tube.

What is claimed is:

1. A method of bending comprising, clamping one end of the tube to a rotatable form having a calculated offset, slidably restraining the other end of the tube to cause it to move longitudinally of its axis, rotating said form, boosting the restrained end of the tube toward the rotating form, wiping the tube at the place of bend with a rigid surface having a calculated offset, both of said calculated offsets being determined by the formula $T_c-T$ where $$T_c=\frac{TA_n(R+T+C)}{A_b(R+T/2)}-K\frac{ST}{R}$$

and $$A_b=H+\frac{2T(R+T+C)}{R+T/2}-Q\frac{ST}{R}$$

wherein K and Q are constants determined empirically to be approximately .2 and .6, respectively, and the other symbols represent dimensions indicated in the drawings.

2. A method of bending hollow material and maintaining the interior cross-sectional dimensions thereof substantially unaltered comprising, securing one end of the hollow material to a rotatable form, internally supporting the hollow material against collapse, restraining the other end of the material so as to move in a straight line toward the form, rotating the form to bend the material, forcing the material toward the form as it is bent, wiping the material adjacent the form at the place of bend with a rigid contoured surface, said rigid surface and the portion of the form adjacent the place of bend having inclinations of predetermined length extending toward each other to control the outward flow of the bent material to an extent predetermined by the formula $T_c-T$ where $$T_c=\frac{TA_n(R+T+C)}{A_b(R+T/2)}-K\frac{ST}{R}$$

and $$A_b=H+\frac{2T(R+T+C)}{R+T/2}-Q\frac{ST}{R}$$

whereby the interior dimensions of the hollow material are maintained substantially unaltered, wherein K and Q are constants determined empirically to be approximately .2 and .6, respectively, and the other symbols represent dimensions indicated in the drawings.

3. A rotatable forming die for bending material having a curved forming surface, a straight portion offset from the curved forming surface and an inclined portion of approximately one inch in length between the straight offset portion and the curved forming surface thereby producing a continuous surface on the forming die, the height of said offset being determined by the formula $T_c-T$ where $$T_c=\frac{TA_n(R+T+C)}{A_b(R+T/2)}-K\frac{ST}{R}$$

and $$A_b=H+\frac{2T(R+T+C)}{R+T/2}-Q\frac{ST}{R}$$

wherein K and Q are constants determined empirically to be approximately .2 and .6, respectively, and the other symbols represent dimensions indicated in the drawings.

4. A wiping die in a bending apparatus having a concave curved portion, an inclined surface of approximately one inch in length intersecting the concave curved portion thereby forming a wedge-shaped section, and a straight portion parallel to the plane tangent to said concave curved portion at the line of intersection of the inclined portion with the concave curved portion, said straight portion being spaced from said tangent plane a distance determined by the formula $T_c-T$ where $$T_c=\frac{TA_n(R+T+C)}{A_b(R+T/2)}-K\frac{ST}{R}$$

and $$A_b=H+\frac{2T(R+T+C)}{R+T/2}-Q\frac{ST}{R}$$

wherein K and Q are constants determined empirically to be approximately .2 and .6, respectively, and the other symbols represent dimensions indicated in the drawings.

5. In a machine for bending hollow bodies, a rotatable forming die, means for clamping one end of a hollow body to the forming die, sliding means for restraining the other end of the body from rotation, a wiping die having one surface thereof positioned adjacent the forming die, said surface being provided with an inclined indented portion adjacent the place of bend for receipt therein of material displaced from a wall of the hollow body during bending, the maximum depth of said indented portion being determined by the formula $T_c-T$ where $$T_c=\frac{TA_n(R+T+C)}{A_b(R+T/2)}-K\frac{ST}{R}$$

and $$A_b=H+\frac{2T(R+T+C)}{R+T/2}-Q\frac{ST}{R}$$

wherein K and Q are constants determined empirically to be approximately .2 and .6, respectively, and the other symbols represent dimensions indicated in the drawings.

6. A method of contouring elongated hollow material comprising, moving the forward end of a hollow material about a forming die, internally supporting the hollow material at the place of bend, restricting the movement of the rear end of the material to a straight line, forcing the rear end of the material forward to control the position of the neutral axis thereof, and wiping the hollow material at the place of bend with a rigid surface provided with an inclined indentation having a maximum depth determined by the formula $T_c - T$ where $$T_c = \frac{TA_n(R+T+C)}{A_b(R+T/2)} - K\frac{ST}{R}$$

and $$A_b = H + \frac{2T(R+T+C)}{R+T/2} - Q\frac{ST}{R}$$

wherein K and Q are constants determined empirically to be approximately .2 and .6, respectively, and the other symbols represent dimensions indicated in the drawings.

7. In a tube bending machine, a rotatable forming die having a portion of a forming surface thereof offset a predetermined distance from the remainder of said forming surface for controlling the flow of metal in a tube being bent, a clamping die for holding one end of the tube against the forming die during the entire bending operation, means for quickly releasing the clamping die, a pressure die for restraining the free end of the tube from moving out of the straight line in which it originally lay, boosting means for urging the free end toward the forming die during the bending operation, a mandrel, means for inserting the mandrel in the tube, a wiping die having a curved extremity positioned adjacent the forming die, a straight wiping surface positioned adjacent the tube and spaced from a plane tangent to one end of the curved extremity by a predetermined offset distance, and a thin spring steel strip interposed between the tube and the wiping and forming dies, said offset distances of the forming die and the wiping die being determined by the formula $T_c - T$ where $$T_c = \frac{TA_n(R+T+C)}{A_b(R+T/2)} - K\frac{ST}{R}$$

and $$A_b = H + \frac{2T(R+T+C)}{R+T/2} - Q\frac{ST}{R}$$

wherein K and Q are constants determined empirically to be approximately .2 and .6, respectively, and the other symbols represent dimensions indicated in the drawings.

References Cited in the file of this patent or the original patent

UNITED STATES PATENTS

| | | |
|---|---|---|
| 456,135 | Brenner et al. | July 21, 1891 |
| 873,023 | Cox | Dec. 10, 1907 |
| 878,604 | Brinkman | Feb. 11, 1908 |
| 1,261,191 | Vallone | Apr. 2, 1918 |
| 1,298,106 | Silvey | Mar. 25, 1919 |
| 1,630,064 | Fuchs | May 24, 1927 |
| 1,690,724 | Frederick | Nov. 6, 1928 |
| 1,714,083 | Frank | May 21, 1929 |
| 2,334,661 | Weimer | Nov. 16, 1943 |
| 2,357,873 | Bower | Sept. 12, 1944 |
| 2,419,711 | Dillon | Apr. 29, 1947 |
| 2,446,413 | Esbjornson | Aug. 3, 1948 |

FOREIGN PATENTS

| | | |
|---|---|---|
| 299 | Great Britain | Jan. 6, 1892 |
| 638,150 | Great Britain | May 31, 1950 |
| 54,759 | France | Aug. 1, 1950 |